United States Patent
Krivitski

(10) Patent No.: US 8,358,654 B1
(45) Date of Patent: Jan. 22, 2013

(54) METHOD AND APPARATUS FOR RULE TESTING

(75) Inventor: Denis Krivitski, Nazareth Illit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 378 days.

(21) Appl. No.: 12/109,711

(22) Filed: Apr. 25, 2008

Related U.S. Application Data

(60) Provisional application No. 60/914,191, filed on Apr. 26, 2007.

(51) Int. Cl.
 *H04L 12/28* (2006.01)
(52) U.S. Cl. ......... 370/392; 370/389; 370/393; 370/394
(58) Field of Classification Search .................. 370/230, 370/235, 351, 392, 399, 401, 393, 394, 389; 711/108, 158; 365/49, 49.17, 49.18, 168
 See application file for complete search history.

(56) References Cited

U.S. PATENT DOCUMENTS

| | | | |
|---|---|---|---|
| 6,691,168 B1* | 2/2004 | Bal et al. ........................ 709/238 |
| 6,775,081 B2* | 8/2004 | Ottesen et al. .................. 360/48 |
| 6,839,800 B2 | 1/2005 | Stark | |
| 7,093,092 B2 | 8/2006 | Stojancic | |
| 7,492,763 B1 | 2/2009 | Alexander, Jr. | |
| 2002/0075714 A1* | 6/2002 | Pereira et al. ................... 365/49 |
| 2002/0126672 A1* | 9/2002 | Chow et al. .................... 370/392 |
| 2002/0191605 A1* | 12/2002 | Lunteren et al. .............. 370/389 |
| 2003/0191740 A1 | 10/2003 | Stark | |
| 2004/0258043 A1* | 12/2004 | Engbersen et al. ........... 370/351 |
| 2005/0081058 A1* | 4/2005 | Chang et al. .................. 713/201 |
| 2006/0114908 A1 | 6/2006 | Kalkunte et al. | |
| 2006/0136570 A1* | 6/2006 | Pandya ........................ 709/217 |
| 2006/0155915 A1 | 7/2006 | Pereira | |

OTHER PUBLICATIONS

Bremler-Barr, Anat et al.; Space-Efficient TCAM-based Classification Using Gray Coding; *INFOCOM 2007*; pp. 1388-1396; 2007.
Office Action issued in U.S. Appl. No. 12/109,703, dated Aug. 31, 2010.

* cited by examiner

*Primary Examiner* — Hassan Phillips
*Assistant Examiner* — Anez Ebrahim

(57) ABSTRACT

Aspects of the disclosure provide an improved method for processing a packet transmitted on a network. The method for processing the packet can include defining a set of non-overlapped intervals on a range field, defining one or more range rules that each range rule is in association with a subset of the non-overlapped intervals, identifying a non-overlapped interval, to which a parameter of the packet belongs, and executing an action on the packet based on a range rule associated with the non-overlapped interval to which the parameter belongs.

19 Claims, 10 Drawing Sheets

| | | 700 |
|---|---|---|
| 0 | 0000 | |
| 1 | 0001 | |
| 2 | 0011 | |
| 3 | 0010 | |
| 4 | 0110 | |
| 5 | 0111 | |
| 6 | 0101 | |
| 7 | 0100 | |
| 8 | 1100 | |
| 9 | 1101 | |
| 10 | 1111 | |
| 11 | 1110 | |
| 12 | 1010 | |
| 13 | 1011 | |
| 14 | 1001 | |
| 15 | 1000 | |

FIG. 7

| Address | Interval Identification |
|---|---|
| 1024 | 0000 |
| 1025 | 0001 |
| 1026 | 0001 |
| 1027 | 0001 |
| 1028 | 0001 |
| 1029 | 0001 |
| 1030 | 0001 |
| 1031 | 0011 |
| 1032 | 0011 |
| 1033 | 0011 |
| 1034 | 0011 |
| 1035 | 0011 |
| 1036 | 0011 |
| 1037 | 0011 |
| 1038 | 0011 |
| 1039 | 1000 |

0 → RID0; 1–6 → RID1; 7–14 → RID2; 15 → Non-Existing RID

FIG. 10

METHOD AND APPARATUS FOR RULE TESTING

INCORPORATION BY REFERENCE

This application claims the benefit of U.S. Provisional Application No. 60/914,191, "Lookup and Gray Range Matching in TCAM" filed on Apr. 26, 2007, which is incorporated herein by reference in its entirety.

BACKGROUND

Policies or rules are widely used in network applications, such as packet routing, packet classification, access control for network security, and the like. For example, network security has become a concern for maintaining a safe use of computer network resources. Generally, a computer network can use packet switching techniques to enable data, which can be encapsulated in packets, to travel from one network domain to another network domain. Therefore, a computer network can apply access control rules at the packet level during packet switching to ensure safe use of network resources.

A rule can generally include conditions, as well as an action that is associated with the conditions. The action can be applied when the conditions are satisfied. In a software based rule applying technique, access control rules can be implemented in software as conditional statements, such as "CASE" statement. The conditional statements can be executed by a processor to test a packet against a predefined set of access control rules. However, such software based rule testing techniques can result in a bottleneck for packet switching, as a result of insufficiently fast software execution speed.

SUMMARY

Hardware based rule testing techniques, such as using ternary content addressable memory (TCAM), can be utilized to improve packet switching speed. However, certain rules, such as range rules, may require a large number of memory entries, which may increase hardware cost, for example.

Aspects of the disclosure can provide an improved method for processing a packet transmitted on a network. The method for processing the packet can include defining a set of non-overlapped intervals on a range field, defining one or more range rules that each range rule is in association with a subset of the non-overlapped intervals, identifying a non-overlapped interval, to which a parameter of the packet belongs, and executing an action on the packet based on a range rule associated with the non-overlapped interval to which the parameter belongs.

To define the one or more range rules, the method can further include assigning the set of non-overlapped intervals with interval identifications (RIDs), encoding RIDs of a subset of the non-overlapped intervals associated with a range rule into one or more entries, and storing the one or more entries in a first memory.

According to the present disclosure, the first memory can include a ternary content addressable memory (TCAM), in which the one or more entries are stored as one or more TCAM entries.

Additionally, the method can further include constructing a search key including an interval identification assigned to the non-overlapped interval to which the parameter of the packet belongs, and comparing the search key with TCAM entries to find a matching TCAM entry.

Furthermore, to execute the action on the packet, the method can include storing the action associated with the range rule at an address in a second memory, and directing the one or more TCAM entries of the range rule in the first memory to the address in the second memory.

According to an aspect of the disclosure, the interval identifications can be Gray coded to further reduce entries of hardware, such as TCAM.

Further, to assign the set of non-overlapped intervals with RIDs, the method can include storing a RID assigned to a non-overlapped interval at one or more addresses of a memory, the one or more addresses can correspond to the non-overlapped interval.

Aspects of the disclosure can also provide an apparatus for processing a packet. The apparatus can include a key constructor configured to construct a search key based on parameters in the packet. The search key can include an interval identification (RID) assigned to an interval, to which a parameter of the packet belongs, the interval being one in a set of pre-defined non-overlapped intervals on a range field of the range rule. Further, the apparatus can include a rule tester coupled to the key constructor, the rule tester being configured to store one or more range rules that each range rule is stored in association with RIDs assigned to a subset of the predefined non-overlapped intervals, and identify a range rule that the RID in the search key lies into the RIDs of the range rule. Additionally, the apparatus can include a packet handler coupled to the rule tester, the packet handler being configured to execute an action associated with the range rule.

Furthermore, aspects of the disclosure can provide a packet switching device for packet processing. The packet switching device can include an interface coupled to an outer link, the interface being configured to receive a packet from the outer link, and a packet processor coupled to the interface to process the received packet. The packet processor can further include a key constructor configured to construct a search key based on parameters in the packet. The search key can include an interval identification (RID) assigned to an interval, to which a parameter of the packet belongs, the interval being one in a set of pre-defined non-overlapped intervals on a range field of the range rule. Further, the apparatus can include a rule applier coupled to the key constructor, the rule applier being configured to store one or more range rules that each range rule is stored in association with IUDs assigned to a subset of the predefined non-overlapped intervals, and identify a range rule that the RID in the search key lies into the RIDs of the range rule. Additionally, the apparatus can include a packet handler coupled to the rule applier, the packet handler being configured to execute an action associated with the range rule.

BRIEF DESCRIPTION OF THE DRAWINGS

Various exemplary embodiments of this disclosure will be described in detail with reference to the following figures, wherein like numerals reference like elements, and wherein:

FIG. 7 shows an example of Gray coding;
FIG. 10 shows a profile of a SRAM unit storing a conversion relationship.

DETAILED DESCRIPTION OF EMBODIMENTS

Hardware based rule testing techniques, such as using ternary content addressable memory (TCAM), can be utilized to improve packet switching speed. For example, a packet switching device can include a TCAM to store access control rules. Each of the access control rules can be stored using one or more TCAM entries. When the packet switching device receives a packet, parameters of the packet can be compared to every entry of the TCAM at the same time to find an access control rule that the parameters satisfy rule conditions. Therefore, packet switching speed can be greatly improved.

However, certain rules, such as range rules including a rule condition that tests if a parameter belongs to a range, can be costly for hardware based rule applying techniques. For example, a range rule may require a large number of TCAM entries to fully cover a range, and thus may increase network device cost. The disclosure can provide a method for implementing range rules in hardware, such as TCAM, with a reduced number of entries.

Figure 1:
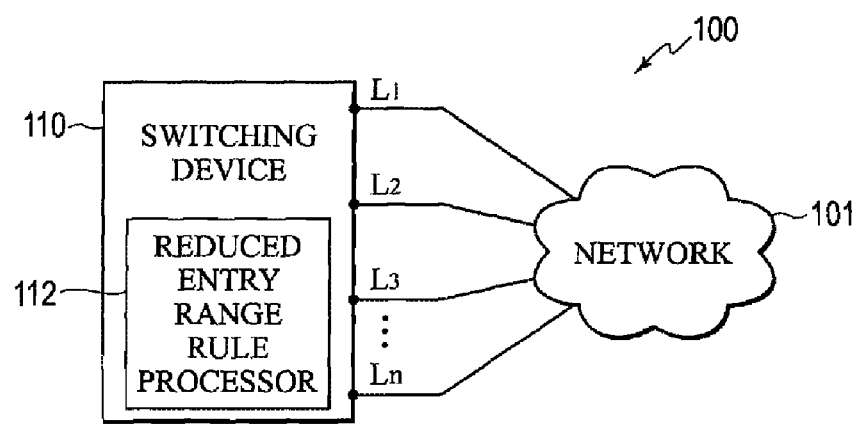
FIG. 1 shows an example of a network system.

FIG. 1 shows an example of a network system utilizing a hardware based range rule applying technique according to the disclosure. The network system 100 can include a network 101 and a network switching device 110 coupled by communication links $L_1$ to $L_n$. The network 101 can send a packet to the network switching device 110 via one of the communication links $L_1$ to $L_n$. The network switching device 110 can perform packet processing, such as applying access control rules, according to the disclosure.

The network 101 can be wired, wireless, a local area network (LAN), a wide area network (WAN), a peer-to-peer network, the Internet, etc. or any combination of these that couples to the network switching device 110. The communication link $L_1$ to $L_n$ can be any type of wired or wireless link, including, but not limited to, multiple twisted pair cables, DSL, coaxial cable, fiber optics, RF cable modems, over-the-air frequency, over-the-air optical wavelength (e.g. infrared), satellite transmission, simple direct serial/parallel wired connections, or the like, or any combinations of these.

The network switching device 110 can include hardware based rule applying techniques, such as at a reduced entry range rule processor 112, which in accordance with an embodiment of the disclosure, employs a reduced quantity of memory entries, to apply range rules on a packet. For example, the network switching device 110 can include a TCAM to store one or more range rules. According to the disclosure, conditions of a range rule, including a range condition, can be stored using a reduced number of TCAM entries. Accordingly, hardware cost can be reduced. Further, the network switching device 110 can receive a packet, and test whether the packet satisfies rule conditions by matching parameters of the packet with the reduced number of TCAM entries. When the packet parameters match one of the reduced number of TCAM entries, the network switching device 110 can perform an action that is associated with the matching entry.

Figure 2:
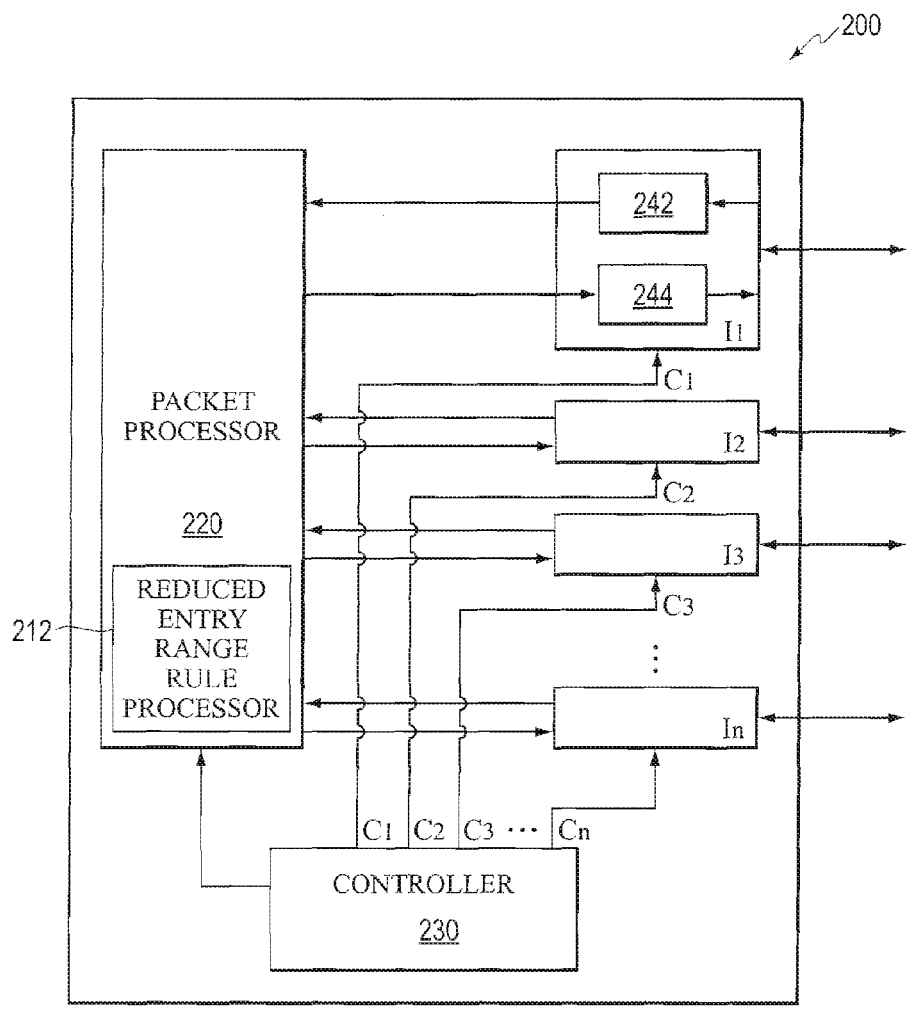
FIG. 2 shows an example of a network switching device.

FIG. 2 shows a detailed example of a network switching device according to the disclosure. The network switching device 200 can include a plurality of port interfaces, such as $I_1$-$I_n$ a packet processor 220 and a controller 230. These elements can be coupled as shown in FIG. 2, for example. The plurality of port interfaces $I_1$-$I_n$ can provide communication interfaces between outer links to the packet processor 220. The port interfaces $I_1$-$I_n$ can receive packets, and transfer the packets to the packet processor 220. The packet processor 220 can make decisions of how to process the packets, and operate accordingly. The controller 230 can provide control signals to the packet processor 220 and the port interfaces $I_1$-$I_n$ to enable the network switching device 200 operations.

Each port interface of $I_1$-$I_n$ can be configured based on communication requirements of an outer link and the packet processor 220. For example, the port interface 240 can include an input interface 242 that can receive data from the outer link and send data to the packet processor 220, and an output interface 244 that can receive data from the packet processor 220 and send data to the outer link. Therefore, the port interface 240 can be configured to provide bilateral direction communications.

The packet processor 220 can further include a reduced entry range rule processor 212, which, accordance with an embodiment of the disclosure employs a reduced quantity of range entries, can apply range rules to a received packet. Each rule can include rule conditions, and a rule action associated with the rule conditions. According to the disclosure, the reduced entry range rule processor 212 can include a range rule, which has a range rule condition. For example, a range rule example can be expressed in plain English as "deny forwarding packet with source address 172.15.5.236 TCP port number between 1 to 14". The range rule example includes a source address condition—"source address 172.15.5.236" and a TCP port condition—"TCP port number between 1 to 14". The TCP port condition is a range rule condition. The range rule example also includes a rule action "deny forwarding" associated with the rule conditions. The reduced entry range rule processor 212 can execute the action when a packet satisfies the rule conditions.

The reduced entry range rule processor 212 can use one or more hardware entries, such as TCAM entries, to implement range rules. According to the disclosure, the reduced entry range rule processor 212 can implement range rules with a reduced number of hardware entries, therefore, hardware cost can be reduced.

Further, the reduced entry range rule processor 212 can receive a packet, and compare parameters of the packet with the hardware implemented rule conditions to find a rule that the packet parameters satisfy the rule conditions. For example, the reduced entry range processor may receive a packet from IP address 172.15.5.236 with TCP port number 13 connected from the port interface $I_1$, and need to be forwarded to a portion of the network connected to the port interface $I_2$. As can be seen, the packet parameters satisfy the source address condition and the TCP port range condition of the above range rule example. Therefore, the reduced entry range rule processor 212 can perform the associated action "deny forwarding" on the packet. Consequently, the packet can be dropped.

The controller 230 can perform various functions to enable the port interface $I_1$-$I_n$, and the packet processor 220 work properly. For example, the controller 230 may control the packet processor 220 to update the access control rules, such as insert a new rule, delete an old rule, and the like.

Figure 3:
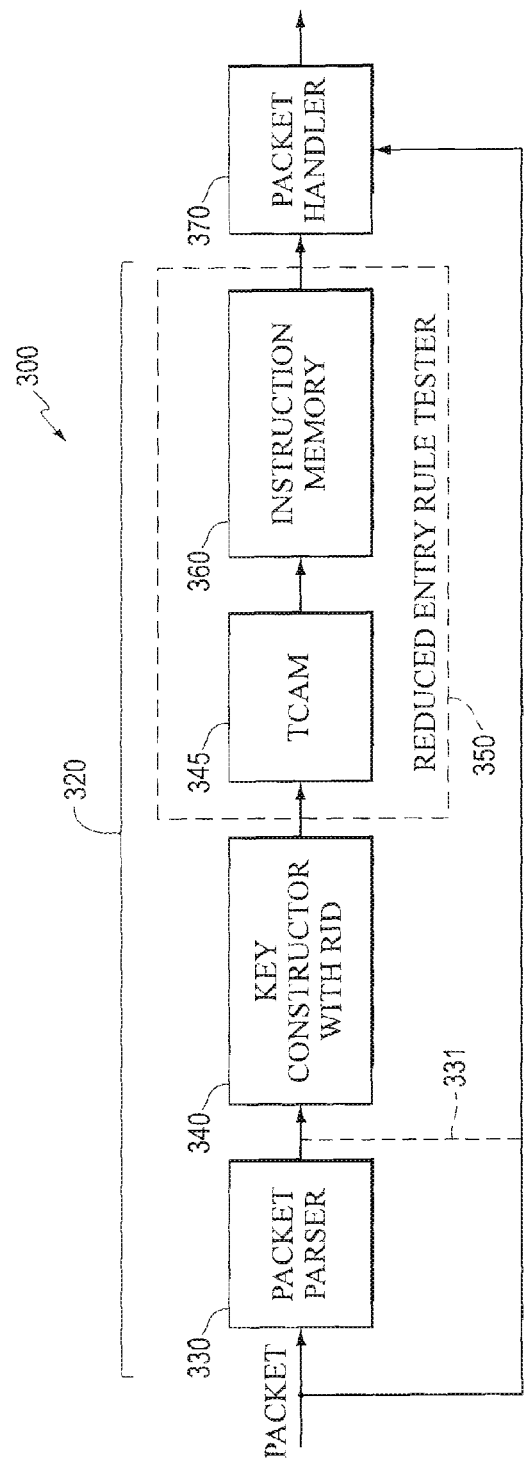
FIG. 3 shows an example of a packet processor.

FIG. 3 shows an example of a packet processor 300 including a reduced entry range rule processor 320. The packet processor 300 can make decisions for further actions on a packet based on parameters of the packet, and can handle the packet accordingly. The packet processor 300 can include the reduced entry range rule processor 320 and a packet handler 370. Further, the reduced entry range rule processor 320 can include a packet parser 330, a key constructor 340 that can construct a key with a range identification, and a reduced entry rule tester 350 that can include a range rule with reduced entries. These elements can be coupled as shown in FIG. 3.

The packet parser 330 can receive a packet, extract packet parameters, and send the packet parameters to the key constructor 340. The key constructor 340 can construct a search key according to the packet parameters. Then the search key can be used by the reduced entry rule tester 350 to compare with rule conditions of a set of rules to find a rule that the search key satisfies the rule conditions. Further, a rule action can be executed by the packet handler 370 to handle the packet accordingly.

The packet parser 330 can receive a packet, and parse the packet according to various layers of communication protocols. Generally, a packet can include various parameters in the packet header according to the communication protocols. Such parameters can include source address, destination address, communication port number, such as TCP/UDP port, operations that require to be performed on the data, and the like. The packet parser 330 can extract the parameters according to the communication protocols.

The key constructor 340 can receive the extracted parameters from the packet parser 330, and include the extracted parameters in a search key. Further, according to the disclosure, the key constructor 340 can include fields that can be computed from the extracted parameters in the search key. For example, the key constructor 340 may include a TCP port interval identification (RID) field in the search key. The TCP port interval identification field can correspond to an interval that the TCP port number of the packet falls into. Then, the search key can be passed to the reduced entry rule tester 350.

The reduced entry rule tester 350 can use the search key to search a rule that the search key satisfies the rule conditions. The reduced entry rule tester 350 can include hardware based rule searching techniques. For example, the reduced entry rule tester 350 can include a TCAM 345 that can store conditions of a rule as one or more entries of the TCAM. According to the disclosure, a number of entries of the TCAM for a range rule can be reduced. Further, search key can be compared to every TCAM entry at the same time to find an entry of a rule, that the search key matches the entry. Subsequently, a rule action of the rule can be executed on the packet based on the RID into which the packet falls. The rule action can be implemented in software as action instructions stored in a memory. The action instructions can be executed by a processor to perform the rule action.

In an embodiment, action instructions can be stored separately from rule conditions to reduce hardware cost. The hardware based rule testing techniques, such as TCAM can be expensive. For example, a TCAM cell may require 10-12 transistors, while a SRAM cell may require 4-6 transistors, and a DRAM cell may require a single transistor. Therefore, the reduced entry rule tester 350 can include a low cost instruction memory 360, such as SRAM, DRAM, and the like, that can store the action instructions associated with the rule conditions in the TCAM. Additionally, each entry of the TCAM 345 may direct to an address in the instruction memory 360 that stores the associated action instructions. Therefore, when a search key matches an entry, the entry can direct to an address that stores the associated action instructions. Consequently, the associated action instructions can be provided to the packet handler 370.

The packet handler 370 can perform actions, such as forwarding, dropping, and the like, on a packet according to the action instructions. While the packet handler 370 in the example, receives an unparsed packet, in another example, the packet handler 370 may receive data of the packet after the packet is parsed, for example via connection 331. Therefore, the packet handler 370 may also encapsulate the data with control parameters into an outgoing packet.

During operation, the packet processor 300 can receive a packet for processing. The packet can be buffered at the packet handler 370 waiting for action instructions. Meanwhile, the packet parser 330 can extract parameters out of the packet, and send the parameters to the key constructor 340. The key constructor 340 can then construct a search key based on the parameters. Further, the search key can be provided to the reduced entry rule tester 350. The reduced entry rule tester 350 can store rule conditions with a reduced number of hardware entries according to the disclosure. In an embodiment, the reduced entry rule tester 350 can include a TCAM 345. The TCAM 345 can store rule conditions as one or more TCAM entries. The search key can be compared to all the TCAM entries at the same time to find a matching entry. The matching entry can then direct to an address of the instruction memory 360 that stores the action instructions for processing the packet. The action instructions can then be provided to the packet handler 370 to handle the packet accordingly.

It is noted that the packet parser 330, the key constructor 340 and the packet handler 370 can be implemented as hardware, software, or a combination of hardware and software. In an embodiment, the packet parser 330, the key constructor 340 and the packet handler 370 can be implemented as software stored in a memory, then a CPU can execute the software, and perform the above described functions. In another embodiment, the packet parser 330, the key constructor 340 and the packet handler 370 can be implemented in an application specific integrated circuit (ASIC) to perform the above described functions.

Figure 4:
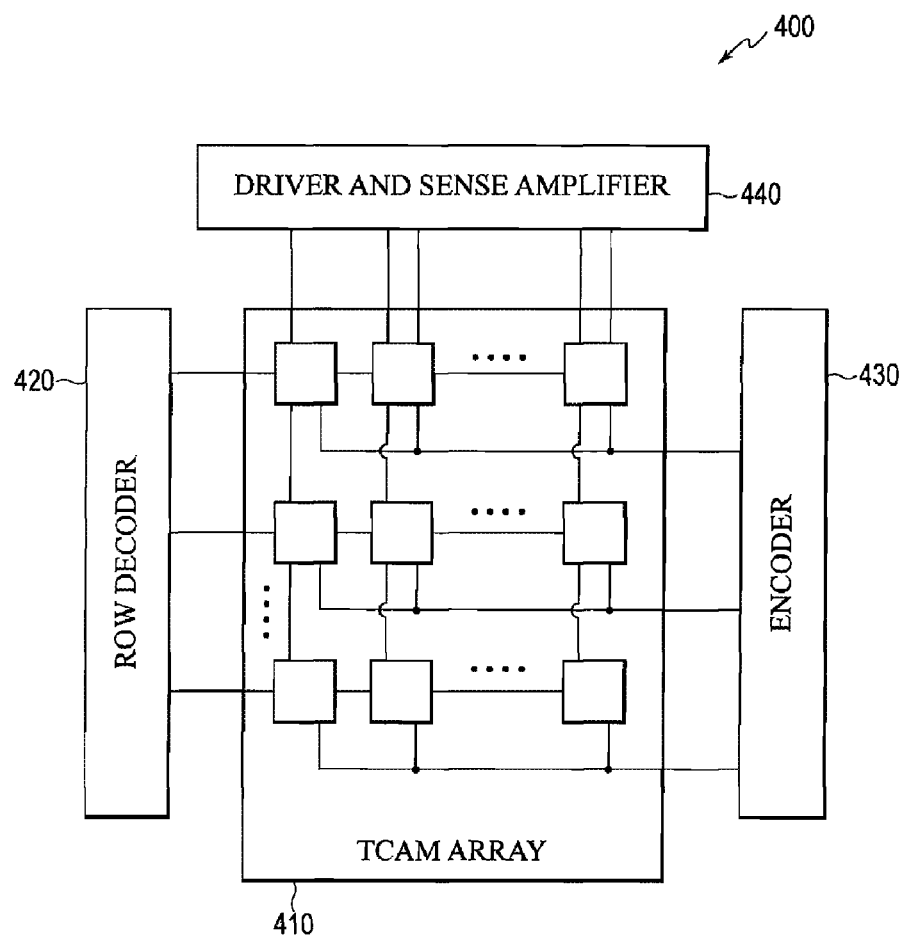
FIG. 4 shows an example of a TCAM.

FIG. 4 shows an example of a suitable TCAM that may be employed in an embodiment. Other suitable memory arrays are also contemplated. The TCAM 400 can include a TCAM array 410, a row decoder 420, a driver 440, and an encoder 430. The TCAM array 410 can store rule conditions as one or more entries. The row decoder 420 can decode a writing address, and enable an entry of TCAM array 410 corresponding to the writing address for writing. The driver 440 can drive a search key or data for writing. The encoder 430 can output an address corresponding to an entry that the search key matches.

The TCAM 400 can be configured to various modes, including a writing mode, and a searching mode. During the writing mode, an entry address can be decoded by the row decoder 420 to enable an entry corresponding to the entry address for writing. The driver 440 can drive data for writing. Thus, the data can be stored at the entry corresponding to the entry address. During the searching mode, the driver 440 can drive a search key. The search key can be compared with every entry of the TCAM at the same time to search for a matching entry. Then the encoder 430 can encode the searching result into an address corresponding to the matching entry, and output the address.

Figure 5:
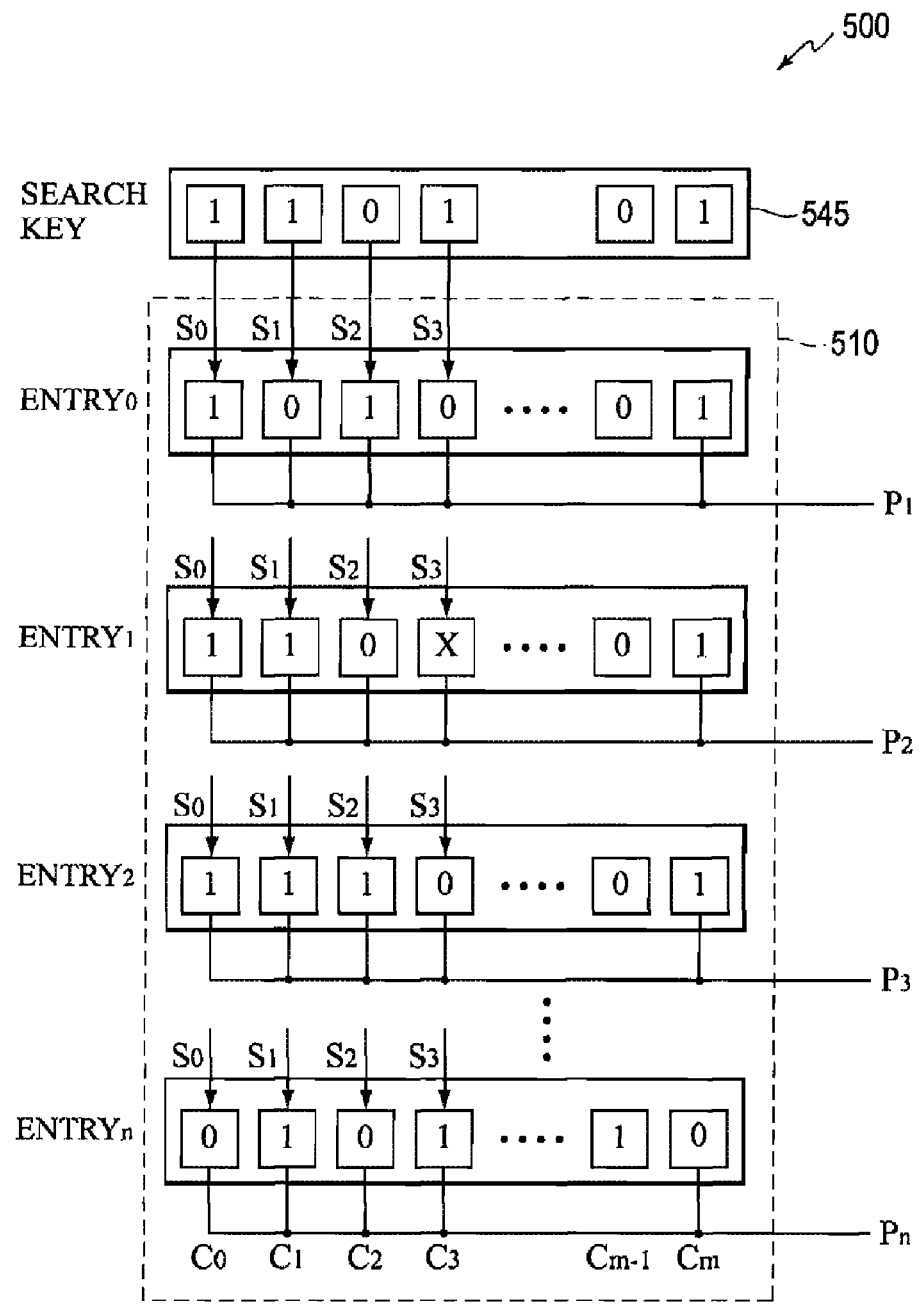
FIG. 5 shows an example of a TCAM array.

FIG. 5 shows a simplified example of a suitable TCAM array that may be employed in an embodiment. Other suitable memory arrays are also contemplated. The TCAM array 510 can include a plurality of entries, such as $Entry_0$-$Entry_n$. Each entry can include a number of TCAM cells, such as $C_0$-$C_m$. Each TCAM cell can be in one of three states, for example storing a ternary value of "0", "1", or "x". The "x" value can mean the system does not care, therefore the "x" value can match both "1" and "0". The TCAM cells can be grouped into fields, such as TCP port field, source address field, destination address field, and the like. In addition, a search key driving circuit 545 can drive a search key in the form of a binary array. Each element of the search key can be coupled with a corresponding TCAM cell in each entry. For example, $S_0$ of the search key can be coupled to $C_0$ of each entry. During a searching mode, the search key element can be compared with the coupled TCAM cell in every entry at the same time. When the search key element and the coupled TCAM cell are of the same value, or when the coupled TCAM cell is "x", the search key element matches the coupled TCAM cell. When every search key element matches the coupled TCAM cell of an entry, the search key matches the entry.

In an embodiment, each TCAM cell may include a first and a second RAM cells, such as DRAM, SRAM, and the like. The first RAM cell can store a binary value "0" or "1", and the second RAM cell can store a binary mask value to indicate whether care or not care the binary value in the first RAM cell. For example, the second RAM cell can store "1" to indicate not care, and store "0" to indicate care the binary value in the first RAM cell. Therefore, the TCAM cell can be configured to one of three states. For example, when the second RAM cell stores "1", the TCAM cell can be in a state of "x", when the second RAM stores "0" and the first RAM stores "0", the TCAM cell can be in a state of "0", and when the second RAM stores "0" and the first RAM stores "1", the TCAM cell can be in a state of "1". The first and the second RAM cells of a TCAM entry can be laid out in various manners. In one example, the TCAM entry can be laid out into two lines, a line of the first RAM cells and a line of the second RAM cells.

Each entry can have a search output, such as $P_0$-$P_n$. The search output can be configured to have a different electrical property when the search key matches the entry. For example, the search output can be pre-charged to a high voltage level. When a search key element does not match the coupled entry cell, a discharging path can be switched on. Subsequently, the search output voltage level can be reduced. Alternatively, when each search key element matches corresponding cell of an entry, no discharging path is switched on. Therefore, the voltage level of the entry search output can be kept high.

Generally, an encoding technique, such as a prefix-expansion technique, can be used to include range conditions as one or more TCAM entries. The prefix-expansion technique can use a prefix "x", which is don't care to match both "0" and "1" at a bit position. For example, a range condition [12, 13] of field $C_0$-$C_3$ can be prefix-expanded into one TCAM entry, which is shown by $Entry_1$ in FIG. 5. A range condition [12, 14] can be prefix-expanded into two TCAM entries, which are shown by a combination of $Entry_1$ and $Entry_2$ in FIG. 5. In another example, a range condition [1, 65534] of a 16-bit range field may be prefix-expanded into 30 entries. In addition, when a range rule has more than one range field, the required entry number can increase dramatically. For example, in a worst case, a range rule having two 16-bit range field may require 30×30=900 prefix-expanded entries. Thus, a large number of TCAM entries can significantly increase hardware cost.

The disclosure can provide a method that can reduce the number of TCAM entries for range rules. According to the disclosure, a field, such as a 16-bit range field that includes decimal numbers 0-65535, can include a set of non-overlapped intervals that each range condition can be represented as a subset of the non-overlapped intervals. Further, an interval identification number can be assigned to each non-overlapped interval. Subsequently, a range condition can be represented as an interval condition. Generally, the interval condition can be shorter than the range condition, therefore the interval condition can require a reduced number of TCAM entries.

Figure 6:
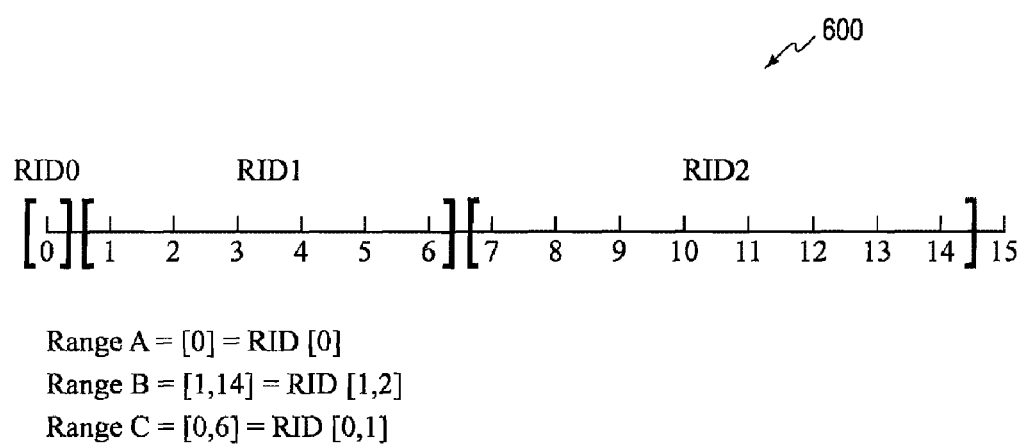
FIG. 6 shows an example of a 4-bit range field.

FIG. 6 shows an example of a 4-bit range field. The 4-bit range field 600 includes numbers 0-15. Three range conditions A-C define range conditions on the 4-bit range field 600. In this example, range condition A defines a range requirement of [0], range condition B defines a range requirement of [1,14], and range condition C defines a range requirement of [0,6]. Accordingly, a set of non-overlapped intervals can be defined on the 4-bit range field, so that each of the range conditions A-C can be represented as a subset of the non-overlapped intervals. For example, three non-overlapped intervals [0], [1,6] and [7,14] can be defined on the 4-bit range field, and assigned interval identification RID-0, RID-1, and RID-2, respectively. Therefore, the range condition A can be represented as the interval condition RID-[0], the range condition B can be represented as interval condition RID-[1,2], and range condition C can be represented as interval condition RID-[0, 1].

According to the disclosure, interval conditions can require a reduced number of TCAM entries. Moreover, Gray coding can be used to further reduce the number of TCAM entries.

FIG. 7 shows an example of a 4-bit range field using Gray coding. As can be seen, any two neighboring numbers of the 4-bit range field 700 can have single bit difference. Therefore, a range of length two on the 4-bit range field 700 can be prefix-expanded into a single entry in the TCAM that the different bit location stores "x".

Figure 8:
FIG. 8 shows a table comparing TCAM entries of three coding methods for range conditions.

FIG. 8 shows a table comparing TCAM entries of the above example. The table 800 includes Field 810, Field 820 and Field 830. The Field 810 shows an example of TCAM entries using range conditions. The Field 820 shows an example of TCAM entries using interval conditions. The Field 830 shows an example of TCAM entries using Gray coded interval conditions. As can be seen, using the range conditions may require 10 entries, while using the interval conditions may require 4 entries and using Gray coded interval conditions may require 3 entries for the range conditions A-C.

Figure 9:
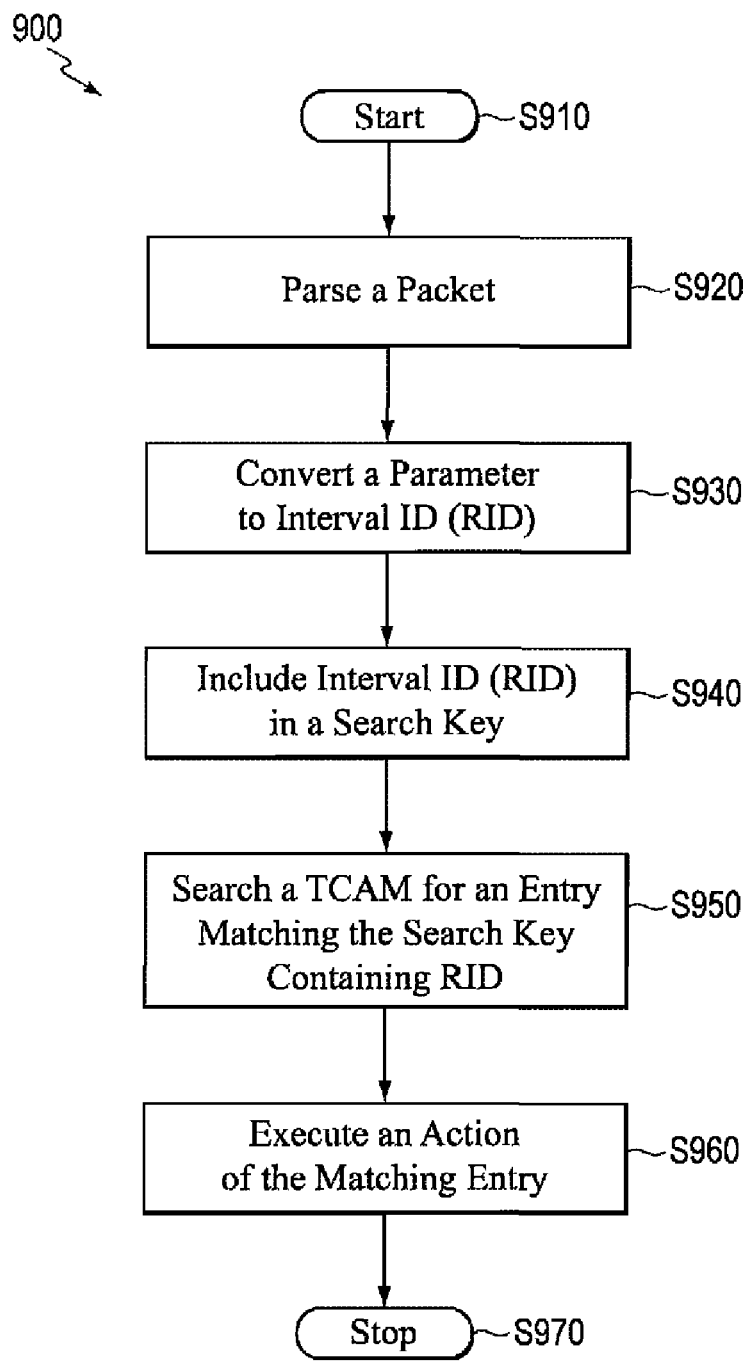
FIG. 9 shows a flowchart outlining an example of a process for rule testing.

FIG. 9 shows a flowchart outlining an example of a process for rule testing. The process starts at step S910, and proceeds to step S920. In step S920, a packet can be received by a packet processor. The packet processor can include a parser that can parse the packet to extract control parameters, such as source address, TCP port number, and the like. The process then proceeds to step S930.

In step S930, a control parameter that may be required to satisfy a range condition can be converted to an interval identification for an interval to which the control parameter belongs. The conversion can be based on a pre-defined relationship of control parameter values and interval identifications for a set of non-overlapped intervals. In an embodiment, the packet processor can include an interval identification memory, such as a SRAM unit. The SRAM unit can pre-store the relationship of the control parameter values and the interval identifications. For example, the SRAM unit can store the interval identifications at addresses that correspond to the control parameter values.

Subsequently, the process proceeds to step S940 where a search key can be constructed. The search key can include the interval identification of the control parameter required to satisfy a range condition.

Then, the process proceeds to step S950, the search key containing the interval identification can be used to find a rule that the search key satisfy the rule conditions. As described above, a range rule can be stored as one or more memory entries, such as TCAM entries, using interval conditions instead of range conditions. Therefore, a reduced number of TCAM entries can be required. Further, Gray coding can be used to further reduce the number of TCAM entries. The search key can be compared to the reduced number of TCAM entries to search an entry that the search key matches the entry. The process then proceeds to step S960.

In step S960, a rule action associated with the range rule can be executed on the packet. In an embodiment, the matching entry can direct to an address in an instruction memory that stores action instructions for the range rule. Therefore, the action instructions can be executed by a packet handler to handle the packet accordingly.

FIG. 10 shows an example of an interval identification memory that can be used in the above process. The interval identification memory 1000 can store a Gray coded interval identification at each address. The address can correspond to a control parameter value, while the Gray coded interval identification can correspond to an interval that the control parameter value belongs to. Therefore, given a control parameter value, its corresponding interval identification can be converted by reading a corresponding address of the interval identification memory 1000.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A method for processing a packet transmitted on a network, comprising:
   defining a set of non-overlapped intervals on a range field;
   defining one or more range rules that each range rule is in association with a subset of the non-overlapped intervals;
   encoding interval identifications (RIDs) of the subset of the non-overlapped intervals into one or more entries;
   storing the one or more entries in a content addressable memory (CAM), each entry of the CAM including an array of CAM cells, each CAM cell having first and second memory cells that are random access memory cells configured to implement at least three different states of the CAM cell;
   identifying a non-overlapped interval, to which a parameter of the packet belongs; and
   executing an action on the packet based on the range rule associated with the non-overlapped interval to which the parameter belongs.

2. The method according to claim 1, wherein defining the one or more range rules, further comprises:
   assigning the set of non-overlapped intervals with interval identifications (RIDs).

3. The method according to claim 2, wherein storing the one or more entries in the CAM, further comprises:
   storing the one or more entries in a ternary content addressable memory (TCAM).

4. The method according to claim 3, further comprising:
   constructing a search key including an interval identification (RID) assigned to the non-overlapped interval, to which the parameter of the packet belongs; and
   comparing the search key with TCAM entries to find a matching TCAM entry.

5. The method according to claim 2, wherein the interval identifications (RIDs) are Gray coded.

6. The method according to claim 5, wherein storing the one or more entries in the CAM, further comprise:

storing the one or more entries in a ternary content addressable memory (TCAM), wherein the one or more entries correspond to Gray coded RIDs that are encoded by prefix-expansion.

7. The method according to claim 6, further comprising:
constructing a search key including a Gray coded interval identification of the non-overlapped interval to which the parameter of the packet belongs; and
comparing the search key with TCAM entries to find a matching TCAM entry.

8. The method according to claim 2, wherein assigning the set of non-overlapped intervals with RIDs, further comprises:
storing a RID assigned to a non-overlapped interval at one or more addresses of a memory, the one or more addresses corresponding to the non-overlapped interval.

9. The method according to claim 8, wherein the RID is Gray coded.

10. An apparatus for processing a packet, comprising:
a key constructor to construct a search key based on parsed parameters in the packet, the search key including an interval identification (RID) assigned to an interval to which a parameter of the packet belongs, the interval being one in a set of pre-defined non-overlapped intervals on a range field;
a rule tester coupled to the key constructor, the rule tester configured to store one or more range rules that each range rule is stored in association with RIDs assigned to a subset of the pre-defined non-overlapped intervals, and to identify a range rule that the RID in the search key lies into the RIDs of the range rule, the rule tester including a content addressable memory (CAM);
the CAM configured to store the RIDs assigned to the subset of the pre-defined non-overlapped intervals of each range rule as one or more entries, each entry of the CAM including an array of CAM cells, each CAM cell having first and second memory cells that are random access memory cells configured to implement at least three different states of the CAM cell; and
a packet handler coupled to the rule tester, the packet handler executing an action associated with the range rule.

11. The apparatus according to claim 10, wherein the key constructor reads the RID at an address that corresponds to the parameter of the packet.

12. The apparatus according to claim 10, wherein the RIDs are encoded into the one or more entries by prefix-expansion.

13. The apparatus according to claim 12, wherein the CAM includes a ternary content addressable memory (TCAM) to store the one or more encoded entries.

14. The apparatus according to claim 10, wherein the RIDs are Gray coded.

15. A packet switching device for packet processing, comprising:
an interface coupled to an outer link, the interface receiving a packet from the outer link;
a packet processor coupled to the interface to process the received packet, the packet processor further comprising:
a key constructor to construct a search key based on parsed parameters in the packet, the search key including an interval identification (RID) assigned to an interval to which a parameter of the packet belongs, the interval being one in a set of pre-defined non-overlapped intervals on a range field;
a rule applier coupled to the key constructor, the rule applier configured to store one or more range rules that each range rule is stored in association with RIDs assigned to a subset of the pre-defined non-overlapped intervals of each range rule, to receive the search key, and to identify a range rule that the RID in the search key lies into the RIDs of the range rule, the rule applier including a content addressable memory (CAM);

the CAM configured to store the RIDs assigned to the subset of the pre-defined non-overlapped intervals of each range rule as one or more entries, each entry of the CAM including an array of CAM cells, each CAM cell having first and second memory cells that are random access memory cells configured to implement at least three different states of the CAM cell; and a packet handler coupled to the rule applier, the packet handler executing an action associated with the range rule.

16. The packet switching device according to claim 15, wherein the key constructor further comprises:

a memory to store a RID at one or more addresses corresponding to an interval to which the RID is assigned, the key constructor reading the RID at an address that corresponds to the parameter of the packet.

17. The packet switching device according to claim 15, wherein the RIDs are encoded into the one or more entries by prefix-expansion.

18. The packet switching device according to claim 17, wherein the CAM includes a ternary content addressable memory (TCAM) configured to store the one or more encoded entries.

19. The packet switching device according to claim 15, wherein the RIDs are Gray coded.

* * * * *